United States Patent [19]

Naseer et al.

[11] Patent Number: 5,347,575
[45] Date of Patent: Sep. 13, 1994

[54] CIRCUIT TO DETECT THE HOOK STATUS AND RINGING AT THE CPE END OF A TELEPHONE NETWORK

[75] Inventors: Absar Naseer, Chandler; Lalit O. Patel, Mesa; Edward M. Horiuchi, Glendale, all of Ariz.

[73] Assignee: AG Communication Systems Corporation, Phoenix, Ariz.

[21] Appl. No.: 857,908

[22] Filed: Mar. 26, 1992

[51] Int. Cl.⁵ ............................................. H04M 3/00
[52] U.S. Cl. .................................. 379/377; 379/373; 379/252
[58] Field of Search ............... 379/377, 373, 375, 376, 379/382, 252, 253, 254

[56] References Cited

U.S. PATENT DOCUMENTS

| | | | |
|---|---|---|---|
| 4,570,034 | 2/1986 | Serrano | 379/373 X |
| 4,742,536 | 5/1988 | Dewenter et al. | 379/377 X |
| 4,847,896 | 7/1989 | Siligoni et al. | 379/377 X |
| 4,995,111 | 2/1991 | Tojo et al. | 379/373 X |

*Primary Examiner*—James L. Dwyer
*Assistant Examiner*—Creighton Smith
*Attorney, Agent, or Firm*—Gregory G. Hendricks

[57] ABSTRACT

A circuit for indicating the status of a telephone line at the CPE end, where the status is either on-hook, ringing, or off-hook is disclosed. The telephone line is the normal two-wire telephone line. First, a transconductance amplifier converts a floating voltage difference between the two-wire telephone line into a current. The current is proportional to the voltage difference. Next, a current to voltage converter converts the current from the transconductance amplifier to a single ended ground referenced voltage. The single ended voltage is proportional to the current from the transconductance amplifier, thus the single ended voltage is proportional to the voltage difference across the two-wire telephone line. A voltage controlled switch is turned ON when the single ended voltage is greater than a predefined value indicating the on-hook status. When the single ended voltage is below the predefined value, the voltage switch is turned OFF indicating the off-hook status. Finally, the ringing status is detected when the voltage controlled switch is turned ON and OFF with a repetitive cycle proportional to the frequency of the ringing.

10 Claims, 1 Drawing Sheet

CIRCUIT TO DETECT THE HOOK STATUS AND RINGING AT THE CPE END OF A TELEPHONE NETWORK

FIELD OF THE INVENTION

The present invention relates to the Customer Premise Equipment (CPE) end of the telecommunications network. Specifically, the present invention is a circuit that detects the presence of ringing signals and whether a telephone is on-hook, or off-hook.

BACKGROUND OF THE INVENTION

Prior to the present invention circuits that detect hook status and ringing generally used numerous components, including several opto-isolators to isolate the circuit. One opto-isolator detected ringing, while a second opto-isolator detected hook status. These opto-isolators created several problems, including increased cost, additional space requirements, and difficulty to remain in compliance with all regulations. Additionally, opto-isolators cannot be integrated into an ASIC (Application Specific Integrate Circuit) limiting the ability of cost and size reduction.

Therefore, it is the objective of the present invention to provide a simple circuit that can detect the status of an attached telephone line.

SUMMARY OF THE INVENTION

In order to accomplish the object of the present invention a circuit is provided for indicating the status of a telephone line, where the status is either on-hook, ringing, or off-hook. The telephone line is the normal two-wire telephone line. The circuit has the following major subparts:

A transconductance amplifier converts a floating voltage difference between the two-wire telephone line into a current. The current is proportional to the voltage difference. Next, a current to voltage converter converts the current from the transconductance amplifier to a single ended ground referenced voltage. Still, the single ended voltage is proportional to the current from the transconductance amplifier, thus the single ended voltage is proportional to the voltage difference across the two-wire telephone line.

A voltage controlled switch is turned ON when the single ended voltage is greater than a predefined value indicating the on-hook status. When the single ended voltage is below the predefined value, the voltage switch is turned OFF indicating the off-hook status. Finally, the ringing status is detected when the voltage controlled switch is turned ON and OFF with a repetitive cycle proportional to the frequency of the ringing.

DESCRIPTION OF THE DRAWINGS

A better understanding of the invention may be had from the consideration of the following detailed description taken in conjunction with the accompanying drawing, in which.

DESCRIPTION OF THE PREFERRED EMBODIMENT

Figure 1:
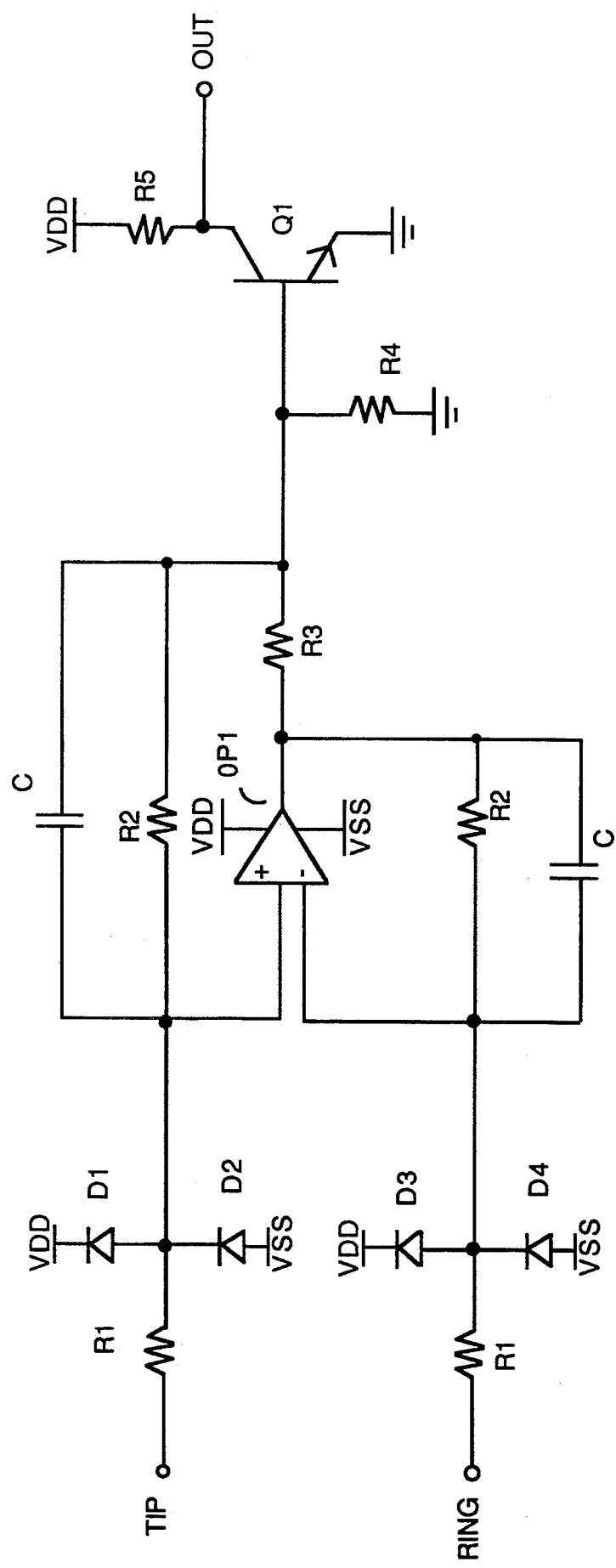
FIG. 1 is a schematic diagram of the present invention.

The present invention is designed to be used at the CPE end of the telephone network, commonly called the Tip-and-Ring. The present invention detects the hook status of the line independent of the number of CPEs connected to the line. When all the CPEs are on-hook (all phones are hung-up), the present invention will report an on-hook condition. When any CPE seizes the line (any phone is picked up), the present invention immediately reports an off-hook condition. The present invention also detects the presence of either A (20 Hz) or B (16 to 68 Hz) type ringing. Because the present invention meets F. C. C. Part 68 on-hook DC resistance requirements (47 C. F. R. § 68.312(b)(1)(i)), the circuit may be permanently connected to the Tip/Ring conductor pair.

The circuit as shown in FIG. 1 is essentially a voltage to current converter. The circuit senses the voltage differential across the tip/ring conductors and converts it into a proportional current, which is then used to generate a logic level indicating the hook status and ringing at the tip/ring. The completely floating and balanced nature of the circuit allows for superior longitudinal balance (47 C. F. R. § 68.310).

With renewed reference to FIG. 1, the operation of the present invention will be described in greater detail. As stated supra, the basic circuit is a transconductance amplifier consisting of resistor pair R1, resistor pair R2 and resistor R3. The input resistor pair R1 does not need to be equal; likewise, the feedback resistor pair R2 does not need to be equal. However, the feedback to input resistor ratio $R_2/R_1$ must be the same for both feedback paths. Equation 1 gives the current to voltage transfer function, or "transconductance", $g_m$, of the circuit:

$$\frac{I}{V_D} = g_m = \frac{R_2}{R_1 \cdot R_3} A \cdot V^{-1}. \qquad \text{EQ. 1}$$

where $V_D$ is the tip voltage minus the ring voltage ($V_{TIP}-V_{RING}$, see FIG. 1) and I is the output current through resistor R3. The voltage rails are generally +5 V and −5 V respectively. The feedback capacitor pair C may be added to perform lowpass filtering of the output current. With the capacitors added, the transconductance is given by EQ. 2:

$$\frac{I}{V_D} = g_m = \frac{R_2}{R_1 \cdot R_3} \cdot \frac{1}{1 + sCR_2} A \cdot V^{-1}. \qquad \text{EQ. 2}$$

Equation 2 shows that the feedback capacitors C have the effect of cascading a single pole lowpass filter section, with a pole frequency of $1/CR_2$ rad/s, to the original transconductance function. The filter's time constant $CR_2$ must be picked appropriately so that the filter's 3dB point is well outside the frequency band of interest.

To meet FCC part 68 on-hook DC resistance requirements, the resistors R1 must be greater than 5 Meg ohms. This high input resistance requirement makes it necessary for the op-amp OP1 to be an FET input stage type. The diode clamps D1 through D4 may be required to protect the circuit from lighting and power cross conditions depending on the value of R1 and the ratio of R1/R2.

Still referring to FIG. 1, remember that $V_D$ is defined as the tip voltage minus the ring voltage. Any positive tip/ring differential voltage will cause the transconductance amplifier to source a proportionate current governed by equation 2. The proportionate current flows through resistor R4 and generates a proportionate voltage across R4. This proportionate voltage is applied across the base-emitter of transistor Q1, and is used to switch Q1. Therefore, transistor Q1 is switched according to the voltage differential present at the tip/ring terminal. In summary, the circuit senses the voltage differential at the tip/ring and converts it into a proportionate current, and then into a proportionate ground referenced voltage that is used to switch a transistor ON or OFF thereby producing a two-state logic signal. The logic signal indicates either an on-hook or an off-hook, or a ringing condition. The switching threshold is controlled by the $g_m$ value given by equation 2 and by the resistor R4, for a given choice of transistor.

When an on-hook condition exists, $V_D$ is approximately at battery voltage, which can be in the range of 40 to 56 V. For an off-hook condition, $V_D$ will be between 4 and 18 V, depending on the loop length and the type of line card used at the Central Office. Therefore, a switching threshold around 26 to 28 V is recommended. The values of gm and R4 can be selected to guarantee that Q1 remains in saturation for $V_D$ larger than 36 V, and that Q1 turns off for $V_D$ lower than 24 V. It follows that the circuit output is a steady logic low for on-hook condition, and a steady logic high when an off-hook condition is detected. If, however, the tip/ring connection is reversed, $V_D$ becomes negative causing the transconductance amplifier to go into a sink mode, and the Q1 output is a steady logic high. Thus, the circuit is tip/ring polarity sensitive. This restriction may be avoided by the addition of a fullwave rectifier as is known in the art. The positive lead of the bridge must be connected to the "TIP" lead, and the negative lead of the bridge must be connected to the "RING" lead. The two "ac" leads of the bridge would then be connected to the tip/ring leads of the line. The bridge rectifier insures that $V_D$ remains positive regardless of the CPE tip/ring polarity. On/off-hook detection will function, in this case, independent of the CPE tip/ring polarity.

From the description above, it follows that when ringing is present on the ring lead, Q1's output is a square wave at the ringing frequency with approximately a 50% duty cycle. If, however, the circuit is preceded by a fullwave bridge rectifier as described supra, then during ringing the output will be a pulse train with a lower duty cycle. If a 50% duty cycle is required at the output, the output of Q1 should be divided in half by, for example, a flip-flop. Note: even with the bridge rectifier, the circuit will still detect type A and B ringing. This assumes the 3dB cut-off point of the filter is chosen to be much higher than the ringing frequency.

Additional items that should be noted and may not be apparent from FIG. 1 are: 1) With R1 at 5 Meg or higher, the circuit effectively implements a zero AC ringer loading; 2) Completely floating and balanced circuit implementation allows a very high level of longitudinal balance to be maintained at the tip/ring terminals; 3) The Resistors R1 can be picked to any value above 5 Meg to guarantee a DC REN of 5 or less; and 4) The circuit is fully monolithically integrable, requiring possibly the capacitor pair C and R1 to be external components.

In summary, the present invention represents an improved, yet simple means of detecting on/off-hook and ringing at the CPE end of the telephone network. The present invention can be left permanently connected to the line independent of the number of other CPEs on the line. The present invention is extremely flexible, allowing the designer to pick the circuit components. The present invention provides a superior longitudinal balance synthesis capability that far exceeds that of other existing tip/ring interface circuits. Finally, the present invention exceeds all compliance requirements.

Although the preferred embodiment of the invention has been illustrated, and that form described, it is readily apparent to those skilled in the art that various modifications may be made therein without departing from the spirit of the invention or from the scope of the appended claims.

What is claimed is:

1. A circuit for detecting the status of a telephone line, said status being either on-hook, or off-hook, said telephone line also providing a ringing signal, said ringing signal having a frequency, said telephone line comprising a first lead and a second lead, said circuit comprising:
   a transconductance means for converting a voltage difference between said first lead and said second lead of said telephone line into a current, said current having a magnitude proportional to said voltage difference; and
   a current detector means for detecting said current from said transconductance means, said current detector means detects said on-hook status when a predefined amount of current is detected, said current detector means detects said off-hook status in an absence of said predefined amount of current, said ringing signal causing said current to fluctuate above and below said predefined amount at the same frequency as said ringing signal, whereby said current detector means also provides alternating on-hook and off-hook status at the same frequency as said ringing signal.

2. A circuit for detecting the status of a telephone line as claimed in claim 1 wherein said transconductance means is a transconductance amplifier.

3. A circuit for detecting the status of a telephone line as claimed in claim 2, said transconductance amplifier comprising:
   a first pair of resistor means, said first pair of resistor means connected to said telephone line;
   a second pair of resistor means, said second pair of resistor means connected to said first pair of resistor means;
   an operational amplifier means, said operational amplifier means connected to said first pair of resistor means and said second pair of resistor means said operational amplifier means having an output, said output being connected to a first resistor of said second pair of resistor means; and
   a first resistor means connected to said output from said operational amplifier means, said first resistor means connected to a second resistor of said second pair of resistor means, said first resistor means arranged to output said current having a magnitude proportional to said voltage difference.

4. A circuit for detecting the status of a telephone line as claimed in claim 3 wherein said second pair of resistor means further includes a pair of capacitor means.

5. A circuit for detecting the status of a telephone line as claimed in claim 1, said current detector means comprising:
   a current to voltage converter means for converting said current from said transconductance means to single ended voltage, said single ended voltage being proportional to said current from said transconductance means; and voltage controlled switch means, said voltage controlled switch means being turned ON when said single ended voltage is greater than a predefined value.

6. A circuit for detecting the status of a telephone line as claimed in claim 5 wherein said voltage controlled switch means is a transistor.

7. A circuit for indicating the status of a telephone line, said status being either on-hook, or off-hook, said telephone line also providing a ringing signal, said ringing signal having a frequency, said telephone line comprising a first lead and a second lead, said circuit comprising:

a transconductance means for converting a voltage difference between said first lead and said second lead of said telephone line into a current, said current having a magnitude proportional to said voltage difference;

a current to voltage converter means for converting said current from said transconductance means to single ended voltage, said single ended voltage being proportional to said current from said transconductance means; and voltage controlled switch means, said voltage controlled switch means being turned ON when said single ended voltage is greater than a predefined value, said voltage controlled switch means being turned ON indicating said status of on-hook, an absence of said voltage controlled switch means being turned ON indicating said status of off-hook, said ringing signal causing said single ended voltage to fluctuate above and below said predefined value at the same frequency as said ringing signal, whereby said voltage controlled switch means also provides alternating on-hook and off-hook status at its same frequency as said ringing signal.

8. A circuit for detecting the status of a telephone line as claimed in claim 7 wherein said voltage controlled switch means is a transistor.

9. A circuit for detecting the status of a telephone line as claimed in claim 7 wherein said transconductance means is a transconductance amplifier.

10. A circuit for detecting the status of a telephone line as claimed in claim 9, said transconductance amplifier comprising:

a first pair of resistor means, said first pair of resistor means connected to said telephone line;

a second pair of resistor means, said second pair of resistor means connected to said first pair of resistor means;

an operational amplifier means, said operational amplifier means connected to said first pair of resistor means and said second pair of resistor means said operational amplifier means having an output, said output being connected to a first resistor of said second pair of resistor means; and a first resistor means connected to said output from said operational amplifier means, said first resistor means connected to a second resistor of said second pair of resistor means, said first resistor means arranged to output said current having a magnitude proportional to said voltage difference.

* * * * *